July 9, 1963
M. AMIRAULT ETAL
ASSEMBLING A FLANGE ON A HUB, PARTICULARLY IN THE MANUFACTURE OF PUMP TURBINES
Filed May 24, 1960
3,096,570
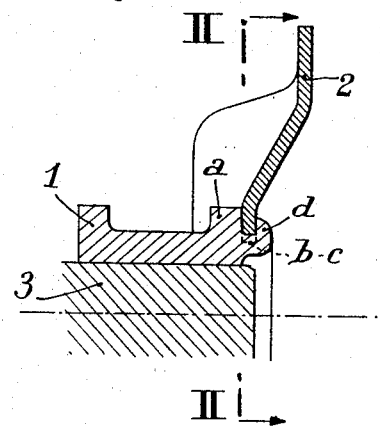
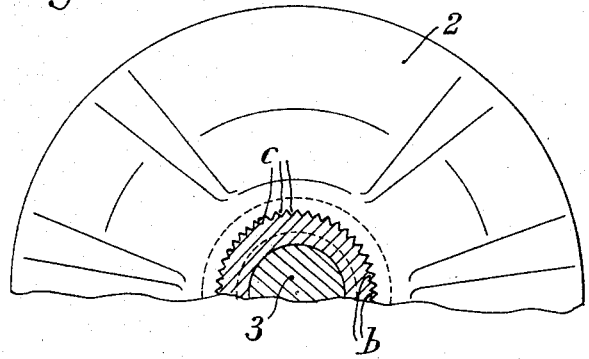

United States Patent Office 3,096,570
Patented July 9, 1963

1

3,096,570
ASSEMBLING A FLANGE ON A HUB, PARTICULARLY IN THE MANUFACTURE OF PUMP TURBINES
Maxime Amirault, 32 Avenue Le Notre, Sceaux, France, and Paul Destoumieux, 16 Avenue Sainte Foy, Neuilly, Seine, France
Filed May 24, 1960, Ser. No. 31,313
Claims priority, application France June 19, 1959
2 Claims. (Cl. 29—156.8)

The present invention relates to the manufacture of pump turbines, particularly those consisting of a cast or machine-made hub and a stamped flange, and, more generally, to any assembly of similar component elements.

In the manufacture of turbines used for small pumps, it is usual to resort to the method whereby a machine-made hub and a stamped flange are assembled together by crimping, centering being carried about some circular portion. The drawback of this method, common to all assemblies made by riveting or crimping, is that the two parts are in danger of working loose under the effect of vibration or chemical attack, with the result that gradually increasing play can develop. In the specific case where a turbine is being built up, uncrimping leads to the two component elements no longer being angularly integral, with resulting failure of the turbine drive.

The present invention, the object of which is to overcome this drawback, is chiefly characterized by the angular coupling of the two hub and flange members by means of male annular notches on one member and female on the other, which mate with one another, the two members being then rendered axially integral by crimping or other suitable means.

This form of coupling ensures that the two components are rendered perfectly integral angularly without any stress being exerted on the axial fixing means. In addition, location on such cogs or notches makes it possible, if required, to obtain any precise, designed relative orientation of the two members.

It is now proposed to describe, by way of example only and not in a limiting sense, an application of the invention to the manufacture of a turbine, with reference to the accompanying drawing, in which:

FIGURE 1 is an axial half-section view.
FIGURE 2 is a sectional view along the lines II—II in FIG. 1.

Referring now to the drawing, the turbine consists of a hub 1 and a stamped flange 2. The hub 1 carries, in cylindrical fashion, about the base of a shoulder portion $a$, notchings $b$ which fit into notchings of identical size $c$ provided over the bore of the flange 2. The angular coupling between the two parts is therefore provided in perfect fashion. The relative axial location is accomplished by tightening the flange 2 against the shoulder portion $a$ of the hub 1 by a suitable crimping $d$. When fitting it to the pump, the hub 1 is forced onto the shaft 3.

In the embodiment shown in the drawing, fine notchings have been adopted to enable them to be produced on the two members by modern and rapid machining methods, say by rolling on the hub and punching in the case of the flange; any other type of toothing can be used, however.

Clearly, many modifications can be made to the embodiment described hereinabove with reference to the accompanying drawing without departing from the scope of the invention. In particular, the male notched portion can be directly machined on the shaft or on a bulged part thereof; furthermore, centering of the two parts relative to each other can be obtained by the fitting together of the two notched parts.

What we claim is:
1. The method of making a pump turbine, including the steps of forming, from an annular blank, by stamping and punching, a flange shaped with blading thereon and having a central bore with internal saw-tooth serrations; forming a hub including a shoulder and a tubular extension projecting beyond said shoulder and having an extremity of cylindrical outer contour the radius of which is only slightly less than the flange bore radius, as measured between the centre of the bore and the tips of said saw-tooth serrations, and a base, against said shoulder, reinforced by projecting serrations of identical profile to those of the central flange bore, engaging the flange by its central bore onto said tubular hub extension until the serrations of the bore engage with those on the base of the tubular extension and the flange is home against the hub shoulder, and crimping the circular edge of the tubular hub extension against the flange.
2. A method according to claim 1, in which the two sets of teeth are of sawtooth profile.

References Cited in the file of this patent
UNITED STATES PATENTS

| 1,796,057 | Smith | Mar. 10, 1931 |
| 2,257,867 | Thrush | Oct. 7, 1941 |
| 2,364,109 | Taylor | Dec. 5, 1944 |
| 2,438,867 | Rockwell et al. | Mar. 30, 1948 |
| 2,718,793 | Hawthorne | Sept. 27, 1955 |

FOREIGN PATENTS

| 210,204 | Great Britain | Jan. 31, 1924 |